(12) United States Patent
Pelman et al.

(10) Patent No.: US 11,623,414 B2
(45) Date of Patent: Apr. 11, 2023

(54) METHOD AND APPARATUS FOR CONTINUOUS FABRICATION OF FIBER-BUNDLE-BASED AND TAPE-BASE PREFORMS

(71) Applicant: Arris Composites Inc., Berkeley, CA (US)

(72) Inventors: Todd Pelman, Moss Beach, CA (US); Christopher Bender, Oakland, CA (US); Dylan Harper, Berkeley, CA (US); Cory Bloome, San Francisco, CA (US); Ethan Escowitz, Berkeley, CA (US); J. Scott Perkins, Oakland, CA (US); Erick Davidson, Piedmont, CA (US); Kameron Butler, San Francisco, CA (US)

(73) Assignee: Arris Composites Inc., Berkeley, CA (US)

( * ) Notice: Subject to any disclaimer, the term of this patent is extended or adjusted under 35 U.S.C. 154(b) by 89 days.

(21) Appl. No.: 17/077,644

(22) Filed: Oct. 22, 2020

(65) Prior Publication Data

US 2021/0114316 A1 Apr. 22, 2021

Related U.S. Application Data

(60) Provisional application No. 62/924,319, filed on Oct. 22, 2019.

(51) Int. Cl.
*B29C 70/32* (2006.01)
*B29C 70/34* (2006.01)
*B29C 70/56* (2006.01)

(52) U.S. Cl.
CPC ............ *B29C 70/32* (2013.01); *B29C 70/345* (2013.01); *B29C 70/56* (2013.01)

(58) Field of Classification Search
CPC ........ B29C 70/32; B29C 70/345; B29C 70/56
See application file for complete search history.

(56) References Cited

U.S. PATENT DOCUMENTS 3,970,495 A * 7/1976 Ashton ................... B29C 33/52
156/162
4,997,503 A * 3/1991 Bohannan ............. B29C 53/581
156/173

(Continued)

FOREIGN PATENT DOCUMENTS

| DE | 102014213294 | 1/2016 |
| EP | 2772344 | 9/2014 |
| FR | 2986988 | 8/2013 |

OTHER PUBLICATIONS

Mertiny, P., F. Ellyin, Influence of the filament winding tension on physical and mechanical properties of reinforced composites, Composites: Part A, vol. 33 (2002), pp. 1615-1622. (Year: 2002).*

(Continued)

*Primary Examiner* — Matthew J Daniels
(74) *Attorney, Agent, or Firm* — Kaplan Breyer Schwarz, LLP

(57) ABSTRACT

A method and apparatus for the continuous fabrication of fiber-bundle-based and composite-tape based preforms and preform charges includes a mandrel about which a constituent material, which is maintained under tension, is wound. The tension is insufficient to fully consolidate the wound material.

22 Claims, 10 Drawing Sheets

(56) References Cited

U.S. PATENT DOCUMENTS

| | | | | |
|---|---|---|---|---|
| 5,458,943 A | * | 10/1995 | Taylor | ............ E06B 3/66319 |
| | | | | 428/34 |
| 5,779,838 A | | 7/1998 | Fellers et al. | |
| 6,613,258 B1 | * | 9/2003 | Maison | ............ B29C 66/112 |
| | | | | 264/102 |
| 2016/0107399 A1 | | 4/2016 | Kwon et al. | |

OTHER PUBLICATIONS

Authorized Officer Robert Barunovic, International Search Report and Written Opinion issued in PCT Patent Application No. PCT/US2020/056868 dated Feb. 2, 2021.

Scholl S et al., Basis fuer die Serienproduktion, pp. 169-174, vol. 102, No. 10.

\* cited by examiner

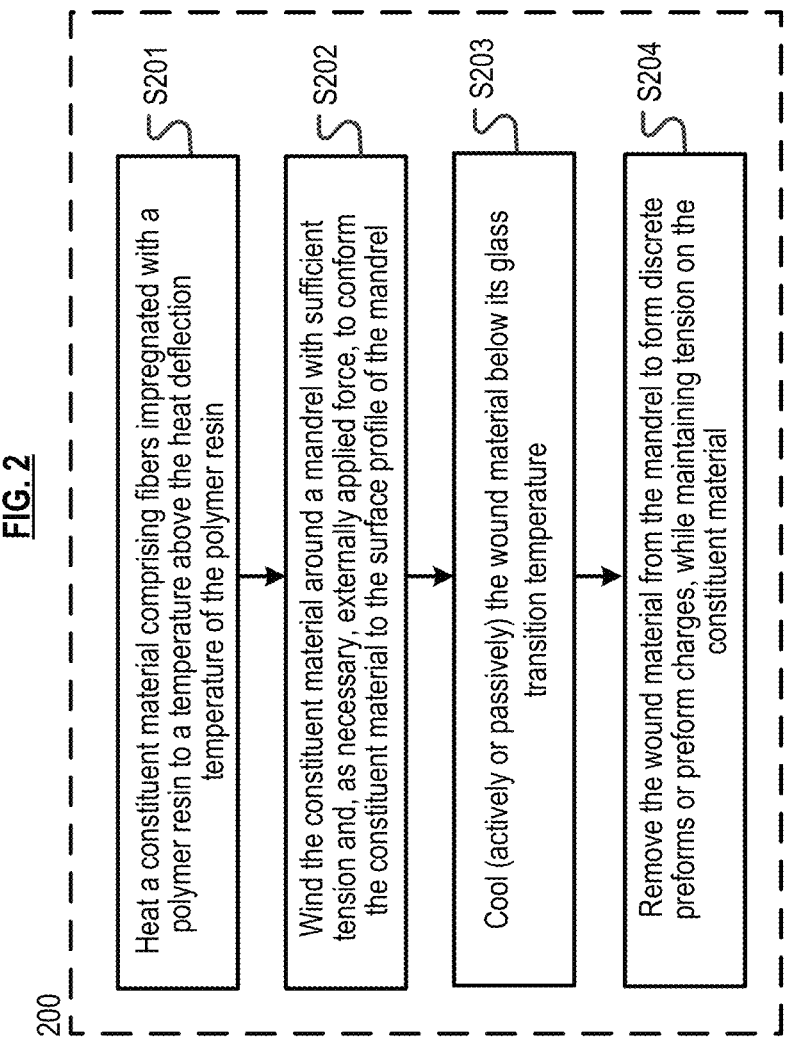

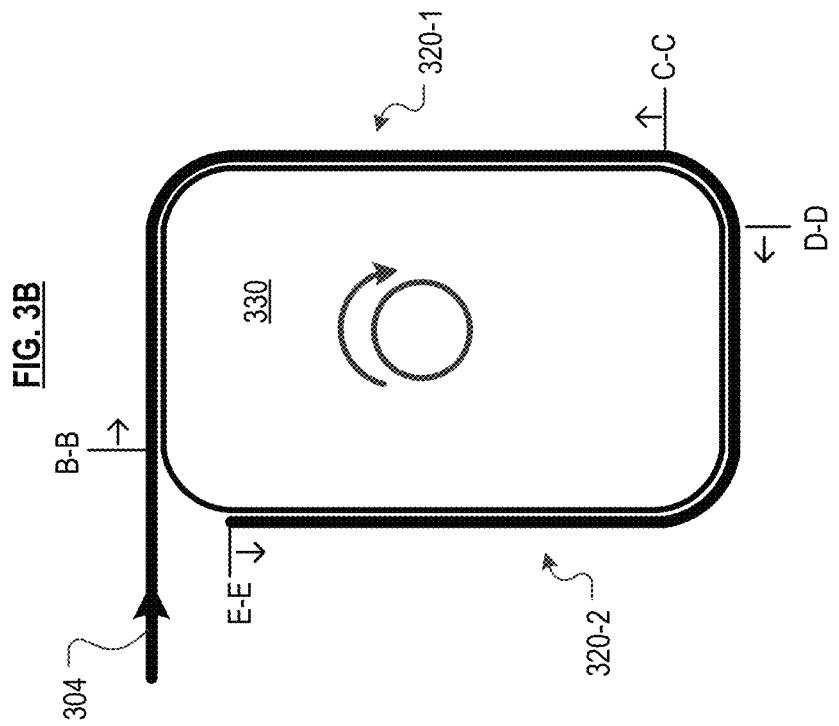
FIG. 3B
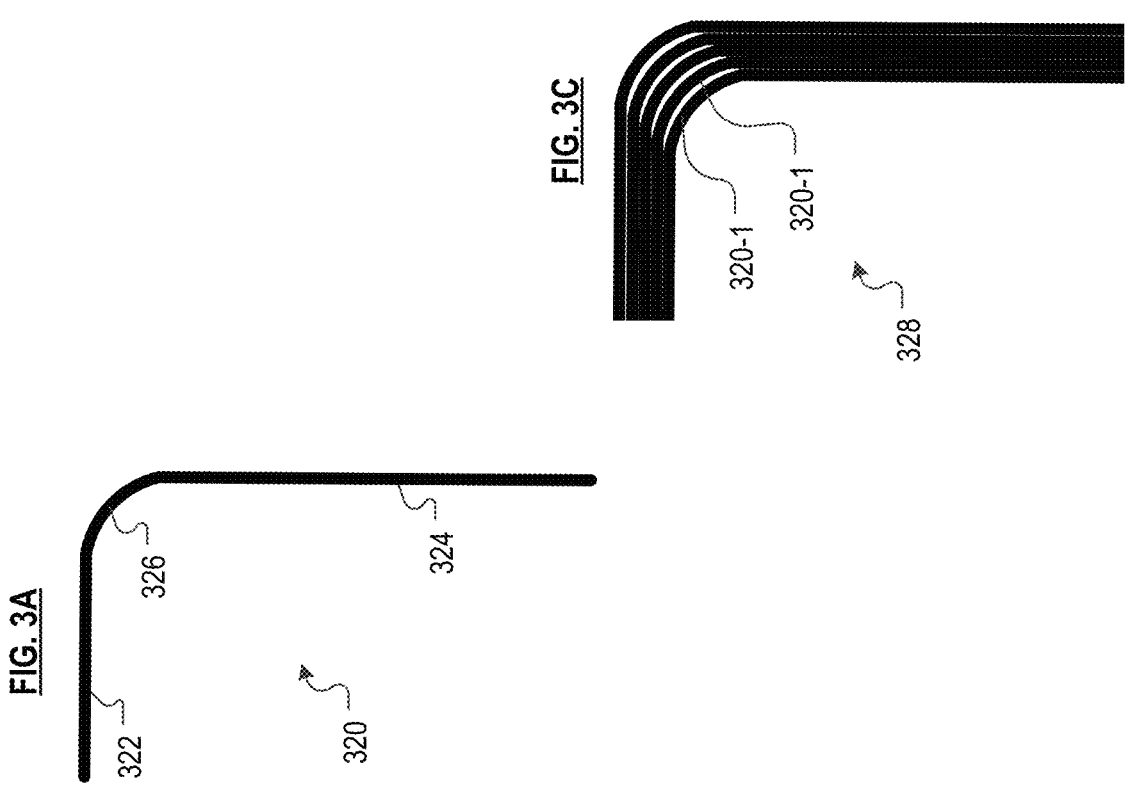
FIG. 3C
FIG. 3A

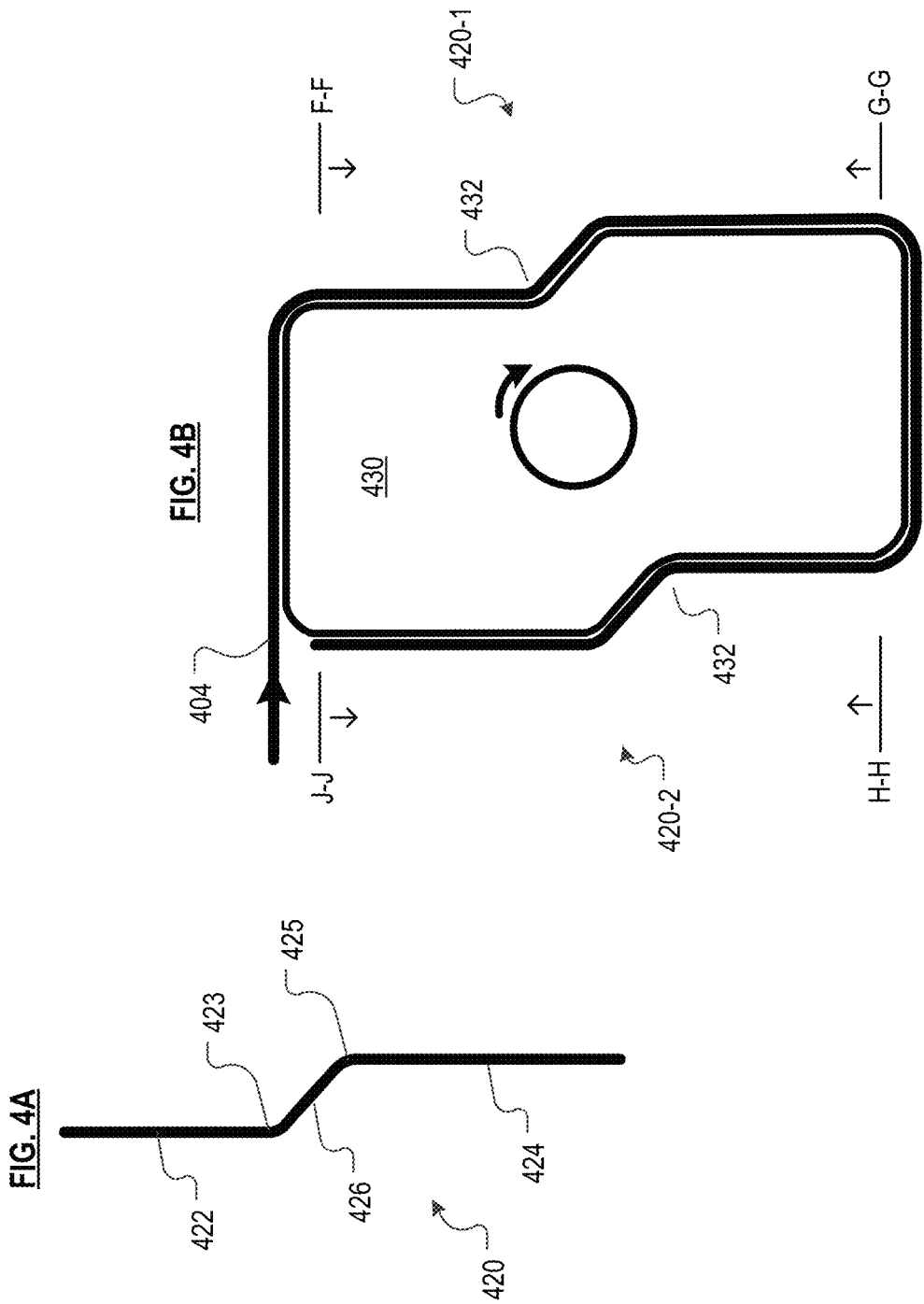

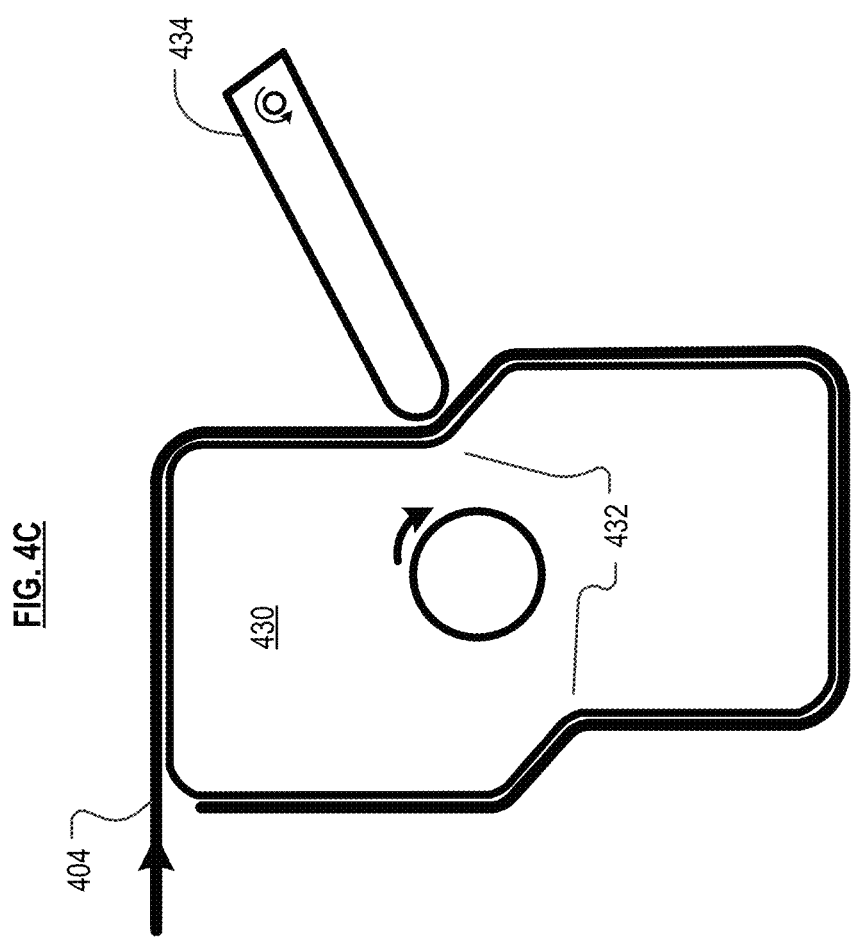

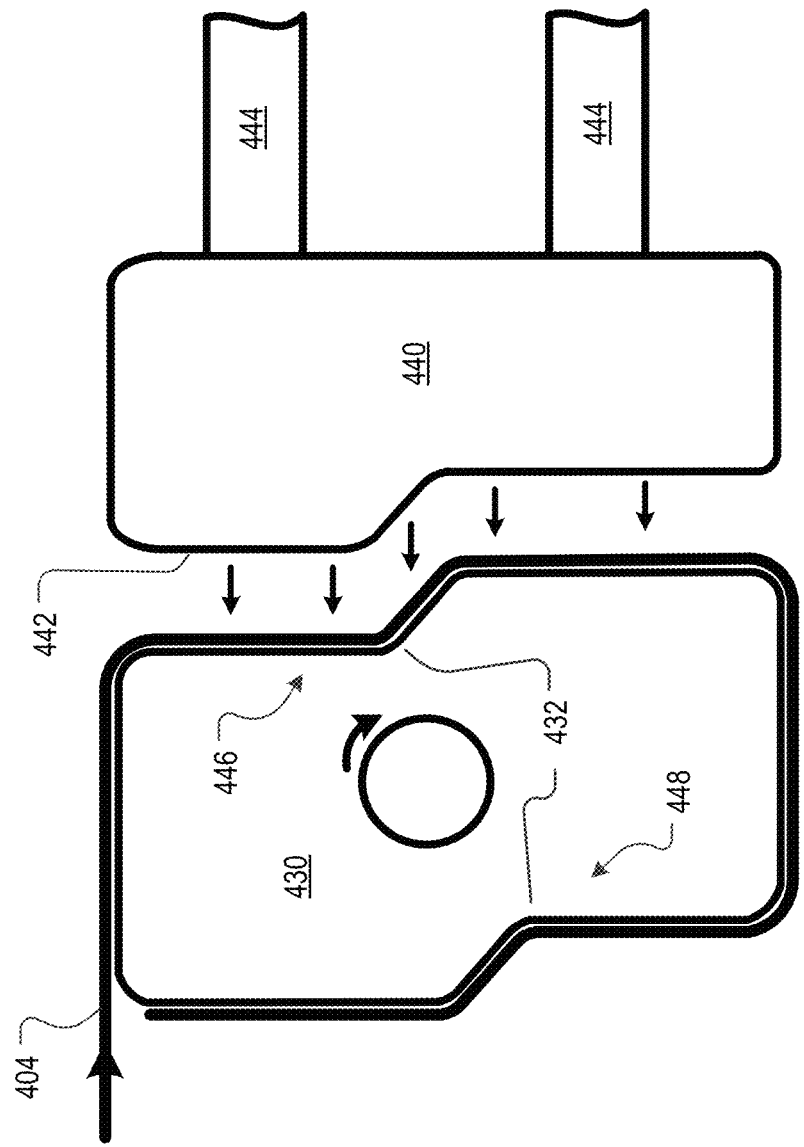

METHOD AND APPARATUS FOR CONTINUOUS FABRICATION OF FIBER-BUNDLE-BASED AND TAPE-BASE PREFORMS

STATEMENT OF RELATED CASES

This specification claims priority of U.S. 62/924,319, which was filed Oct. 22, 2019 and is incorporated by reference herein.

FIELD OF THE INVENTION

The present invention pertains to the fiber composites, and more particularly to the fabrication of fiber-composite parts, and precursors thereof, via compression molding.

BACKGROUND OF THE INVENTION

Applicant has developed compression molding processes that facilitate high-volume fabrication of fiber-composite parts, particularly for applications requiring light weight and high strength. The constituent materials used in such processes include plural fibrous elements—fibers (e.g., carbon fibers, glass fibers, etc.)—and a polymer resin. Typically, the constituent materials are combined, prior to molding, in the form of "prepreg;" that is, plural resin-impregnated fibers.

Prepreg typically comprises many thousands of fibers. It is produced in a variety of aspect ratios (width:thickness) ranging from high-aspect-ratio form factors, wherein the material is referred to as "tape," to low-aspect-ratio form factors, wherein the material is referred to as "tow," "filament," or "fiber bundle." Tape typically has an aspect ratio, as defined above, in the range of about 10:1 to about 30:1, and tow typically has an aspect ratio in the range of about 0.25:1 to about 6:1. Tow is available in a variety of different cross sections including oblong, round, square, etc. When the fibers of "tow" are impregnated with resin, as described above, the tow is referred to as "towpreg."

Applicant has developed processes whereby, in conjunction with and specific to compression molding, towpreg or tape is configured into particular geometries, such as by cutting and bending such material. The configured towpreg is referred to by applicant as, respectively, a fiber-bundle-based preform; the configured tape is referred to by applicant as a tape-based preform (hereinafter collectively referred to as a "preform").

These preforms, based on their placement in a mold, can facilitate a specific fiber alignment and/or satisfy other requirements for a molded part. Moreover, applicant's technology favors the consolidation of individual preforms into an aggregation thereof, referred to by applicant as a "preform charge."

Bundling and tacking preforms together to create a preform charge, as has been disclosed for fiber-bundle-based preforms by applicant, provides a number of benefits. In particular, in embodiments in which the preform charge is assembled outside of a mold, the preform charge can be readily inspected, such as to ensure proper alignment of the constituent preforms with respect to one another. This is typically more important for fiber-bundle-based preforms than tape-based preforms, since the flatter form factor of the tape-based preforms renders them less likely to move once placed. Furthermore, the preform charge can be sized and shaped to match mold features so that it is necessarily situated and remains in a single, desired position, wherein all fibers in the preform charge are ideally aligned with respect to the mold cavity. That is, the preform charge can be naturally "registered" in the mold and held in place therein by virtue of its shape and size. Additionally, forming a preform charge typically improves the overall efficiency of the compression-molding process since this typically reduces the number operations (robotic or otherwise) required to fill the mold with the requisite amount of material.

As production rate and efficiency are key factors in the commercial viability of a compression-molding process, any new production techniques that improve these factors are beneficial.

SUMMARY

In accordance with the present teachings, a method for the continuous fabrication of preforms and preform charges is provided. Relative to the methods hitherto disclosed by applicant, wherein preforms and preform charges were formed batchwise (i.e., one-by-one), embodiments of the invention increase the rate of production of preforms and/or preform charges. In an integrated processing line wherein the feed constituents are produced and then moved to a mold for part fabrication, this increased production rate of feed constituents equates to an increase in the production rate of the corresponding fiber-composite parts.

During the development of fixtures for forming preform charges from preforms, applicant recognized that preforms having certain geometries could be formed more efficiently by means of a mandrel. Use of the mandrel enables preforms and preform charges to be formed in a continuous fashion, as opposed to the discrete, non-continuous operation of bending apparatuses previously used. A reduction in processing steps yields benefits such as reduced cycle time and increased output of preforms/preform charges.

Of course, the use of a mandrel for forming a composite material is well known, such as practiced in "filament-winding." That process enables the formation of hollow 3D structures, typically pipes or tubing, from linear tape precursor via a rotating mandrel. That process involves winding tape under tension over a rotating mandrel. The mandrel rotates around a first axis, while a delivery eye on a carriage traverses horizontally along a second axis parallel to the axis of the rotating mandrel, laying down fibers in a desired pattern and at a desired angle. The fibers within the tape, typically glass or carbon fiber, are impregnated in a bath with resin as they are wound onto the mandrel. Once the mandrel is covered with fiber to a desired thickness, the resin (typically a thermoset) is cured. Once the resin has cured, the mandrel is extracted, leaving the hollow final product. In some cases, the mandrel becomes a permanent part of the finished product.

As mentioned above, the resin used for filament winding is typically a thermoset. The compaction of the thermoset-infused fibers on the mandrel is achieved through fiber tension. If tension on the tape is too low, the composite laminate structure will have lower mechanical strength and performance. If the tension is too high, the tape may experience fraying or fuzz buildup. Thermoset consolidation pressures, as provided by the tension in the tape, are over an order of magnitude less than are required for thermoplastic. When thermoplastic resin is used for filament winding, a compaction roller is used to provide the requisite consolidation, since the tension is tape would be insufficient to provide the requisite pressure.

Embodiments of the present invention utilize such teaching differently. In particular, a rotating mandrel is used to fabricate, in a continuous manner, tow and/or tape preforms and preform charges, from thermoplastic-based composite tape or towpreg, for use in compression molding. In some embodiments, the rotating mandrel is integrated in-line with a continuous industrial prepreg process, thus forming preforms and/or preform charges as part of the process of forming the prepreg itself.

Unlike filament winding, which fully compacts the fiber/resin to form finished parts (using a compaction roller as necessary for thermoplastic resin systems), applicant's process does not fully compact the filament/resin that is wound onto the mandrel. A compaction roller is not used, and tension on the tape or towpreg is otherwise insufficient for full consolidation. In applicant's process, consolidation is typically less than 80% complete, and significantly more pressure would be required to achieve full consolidation. The preforms and preform charges resulting from the present teachings only achieve full consolidation during a subsequent compression-molding process, which for applicant's approach as described herein, is required to create a finished part.

In operation, the constituent material (i.e., tape or towpreg) is formed into a specific shape following the outer surface contour of the mandrel. The constituent material is forced into shape on the mandrel via winding tension. The geometry of a preform or preform charge being produced is not limited to a radially symmetric design, since the mandrel and constituent feed can be translated axially relative to one another, thereby providing an ability to distribute the constituent material along the mandrel as desired. Nor is the geometry of a preform or preform charge produced by embodiments of the invention even limited to a convex design.

The process of winding constituent material around the mandrel requires maintaining tension between the winding surface (i.e., the mandrel) and the source of constituent material. After preforms or preform charge(s) are wound about the mandrel, they are removed therefrom via cutting, slicing, splicing, collapsible mandrel features, or other techniques. Once removed, the preforms or preform charge(s) are fed to a next process step. For preforms, this next stage is typically staging for transfer to a preform charge fixture for creating a preform charge. This will typically occur in instances in which the preform charge has a geometry that is too complex for fabricating via a mandrel as disclosed herein. For a preform charge, the subsequent step is typically staging for transfer to a mold cavity or for quality inspection prior to placement into a mold cavity. Alternatively, in some embodiments, the preforms and/or preform charge(s) are deposited directly into the mold cavity for molding.

Important operational parameters include, without limitation:
proper tensioning during winding;
spacing and overlap of the constituent material (i.e., tape or towpreg);
temperature control of the constituent material;
the local environment;
mandrel design;
mandrel rotational speed;
mandrel rotational-axis movement relative to constituent material;
the relationship of the constituent material to mandrel surface geometry/features;
mandrel degrees-of-freedom of movement; and
the extent of integration with the source of constituent materials.

In a first embodiment, the invention provides a method comprising:

(a) winding a first length of a constituent material around a mandrel, the constituent material consisting essentially of fiber and resin in the form of a fiber bundle or tape, and wherein the constituent material is under a sufficient amount of tension during the winding to conform to a surface profile of the mandrel, but is not subjected to a force sufficient to cause full consolidation of the constituent material;

(b) removing the constituent material from the mandrel after a temperature of the constituent material falls below a glass-transition temperature of the resin, wherein tension is maintained on a portion of the first length of constituent material, thereby enabling winding a second length of the constituent material around the mandrel, providing for continuous production of wound constituent material; and (c) winding the second length of the constituent material around the mandrel, and repeating (a) and (b) for the second length of the constituent material.

In a second embodiment, the invention provides a method that, in addition to the steps of the first embodiment, comprises sectioning the wound constituent material into a plurality of preforms or preform charges.

In a third embodiment, the invention provides a method that, in addition to the steps of the first and second embodiments, comprises forming a part by:

placing at least some of the plurality of preform charges in a mold cavity;

raising temperature and pressure within the mold cavity, and maintaining raised temperature and pressure for a period of time in accordance with compression molding protocols; and ejecting a finished part from the mold cavity.

In another embodiment, the invention provides a method for forming a partially consolidated, fiber-composite form having a non-linear shape, the method comprising:

winding a first length of a constituent material around a mandrel, the constituent material consisting essentially of fiber and resin in the form of a fiber bundle or tape, the first length of constituent material maintained under sufficient tension during the winding to conform to a surface profile of the mandrel, wherein a temperature of the first length of the constituent material is greater than or equal to a heat deflection temperature of the resin; and removing the constituent material from the mandrel after a temperature of the constituent material falls below a glass-transition temperature of the resin, wherein tension is maintained on a portion of the first length of constituent material, thereby enabling winding a second length of the constituent material around the mandrel, providing for continuous production of wound constituent material.

In a further embodiment, the invention provides a system comprising:

a continuous or semi-continuous source of a constituent material consisting essentially of fiber and resin in the form of a fiber bundle or tape;

an energy source, wherein the energy source is physically adapted to heat the constituent material to a temperature in excess of a heat-deflection temperature of the resin;

a mandrel, the mandrel having a rotation axis about which the mandrel is rotatable; and a guide for directing the constituent material onto the mandrel, wherein at least one of the guide and the mandrel are movable in a direction orthogonal to the rotation axis thereby providing an ability to deliver the constituent material along a length of the mandrel, wherein:

the system is physically adapted to place the constituent material under an amount of tension that is sufficient to cause the constituent material to conform to a surface profile of the mandrel during winding about the mandrel, and further wherein the constituent material is not subjected to a force sufficient to cause full consolidation thereof.

Additional embodiments of the invention comprise any other non-conflicting combination of features recited in the above-disclosed embodiments, in the Detailed Description below, and the appended drawings.

BRIEF DESCRIPTION OF THE DRAWINGS

FIG. 2 depicts a flow diagram of a method for continuously forming preform(s)/preform charge(s) in accordance with the illustrative embodiment of the present invention.

FIG. 3A depicts a preform that can be formed by a method in accordance with the present invention.

FIG. 3B depicts a mandrel suitable for forming the preform of FIG. 3A, using a method in accordance with the present invention.

FIG. 3C depicts a preform charge than can be formed via the mandrel of FIG. 3B.

FIG. 4A depicts a preform that can be formed by a method in accordance with the present invention.

FIG. 4B depicts a mandrel suitable for forming the preform of FIG. 4A, using a method in accordance with the present invention.

FIG. 4C depicts a first arrangement suitable for imparting an external force to form the preform of FIG. 4A in conjunction with use of the mandrel of FIG. 4B.

FIG. 4D depicts a second arrangement suitable for imparting an external force to form the preform of FIG. 4A in conjunction with use of the mandrel of FIG. 4B.

DETAILED DESCRIPTION

Definitions

Figure 1:
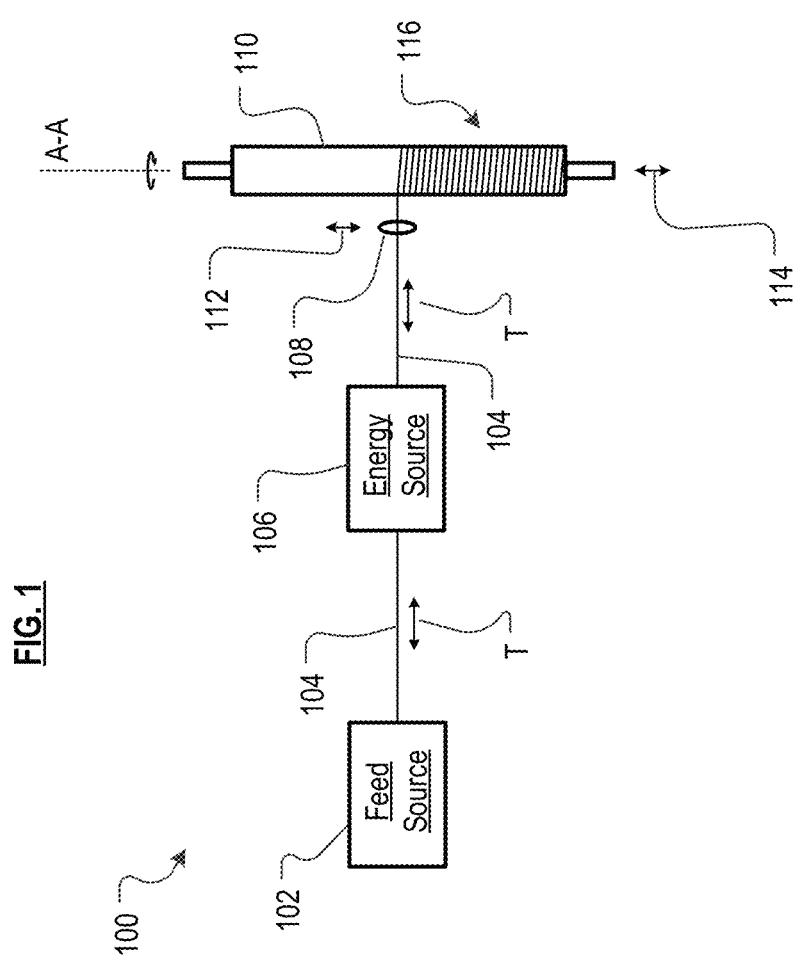
FIG. 1 depicts the salient elements of a system for continuously forming preform(s)/preform charge(s) in accordance with the illustrative embodiment of the present invention.

The following terms and their inflected forms are defined for use in this description and the appended claims:

"Tow" means a bundle of fibers (i.e., fiber bundle), and those terms are used interchangeably herein unless otherwise specified. Tows are typically available with fibers numbering in the thousands: a 1K tow, 4K tow, 8K tow, etc.

"Prepreg" means fibers that are impregnated with resin.

"Towpreg" means a fiber bundle (i.e., a tow) that is impregnated with resin.

"Fiber-bundle-based preform" means a segment of a bundle of plural, unidirectionally aligned, same-length fibers. The segment is cut to a specific length, often from a long length of towpreg, and, in many cases, will be shaped (e.g., bent, twisted, etc.) to a specific form, as appropriate for the specific part being molded. The cross section of a fiber-bundle-based preform, and the fiber bundle from which it is sourced, typically has an aspect ratio (width-to-thickness) of between about 0.25 to about 6. Nearly all fibers in a given preform have the same length (i.e., the length of the preform) and, as previously noted, are unidirectionally aligned.

"Composite tape preform" means a segment of a flat-form-factor grouping of plural, unidirectionally aligned, same-length fibers. The term "flat form factor" references an aspect ratio (width-to-thickness) of at least about 10:1, and typically between about 10:1 and 30:1.

"Consolidation" means, in the molding/forming arts, that in a grouping of fibers/resin, void space is removed to the extent possible and as is acceptable for a final part. This usually requires significantly elevated pressure, either through the use of gas pressurization (or vacuum), or the mechanical application of force (e.g., rollers, etc.), and elevated temperature (to soften/melt the resin).

"Partial consolidation" means, in the molding/forming arts, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Preform Charge" means an assemblage of fiber-bundle-based preforms or composite-tape-based preforms that are at least loosely bound together so as to maintain their position relative to one another. Preform charges can contain a minor amount of fiber in form factors other than fiber bundles or tape, and can contain various inserts, passive or active. As compared to a final part, in which fibers/resin are fully consolidated, a preform charge is only partially consolidated (lacking sufficient pressure and possibly even sufficient temperature for full consolidation). By way of example, whereas a compression-molding process is typically conducted at about 150-300 psi, the downward pressure applied to the preforms to create a preform charge in accordance with the present teachings is typically in the range of about 10 psi to about 100 psi. Thus, voids remain in a preform charge, and, as such, the preform charge cannot be used as a finished part.

"About" or "Substantially" means+/−20% with respect to a stated figure or nominal value.

Unless otherwise indicated, all numbers expressing, for example, quantities of ingredients used in the specification and in the claims are to be understood as being modified in all instances by the term "about." Accordingly, unless indicated to the contrary, the numerical parameters set forth in the following specification and attached claims are understood to be approximations that may vary depending upon the desired properties to be obtained in ways that will be understood by those skilled in the art. Generally, this means a variation of at least +/−20%.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

Embodiments of the invention provide a method for creating, in continuous fashion, preforms or preform charges from composite tape or towpreg using a rotating mandrel. This is an advancement, where applicable, over the use a tow-bending machine (for creating preforms) and over the use of a preform-charge fixture (for creating preform charges).

The preforms and preform charges formed in accordance with the present teachings are used as a feed constituent for compression-molding processes described elsewhere by applicant. Compression molding involves the application of heat and pressure to feed constituents for a period of time. The applied pressure is usually in the range of about 100 psi to about 300 psi, and temperature, which is a function of the particular resin being used, is typically in the range of about 150° C. to about 400° C. Once the applied heat has increased the temperature of the resin above its melt temperature, it is no longer solid. The resin will then conform to the mold geometry via the applied pressure. Elevated pressure and temperature are typically maintained for a few minutes. Thereafter, the mold is removed from the source of pressure and is cooled. Once cooled, the finished part is removed from the mold.

As previously noted, the fiber-bundle-based preforms and composite tape preforms include fibers and resin. Fibers suitable for use in conjunction with the invention include any type of fiber that can withstand the operating temperatures of the molding process being used, such as the compression molding process. Typically, that temperature is a function of resin selection.

Examples of suitable fiber include, without limitation, carbon, glass, natural fibers, aramid, boron, metal, ceramic, polymer filaments, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), alumina silicate, calcium silicate, rock wool, boron nitride, silicon carbide, and combinations of any of the foregoing. Furthermore, carbon nanotubes can be used.

Each individual fiber can be formed of a single material or multiple materials (such as from the materials listed above), or can itself be a composite. For example, an individual fiber can comprise a core (of a first material) that is coated with a second material, such as an electrically conductive material, an electrically insulating material, a thermally conductive material, or a thermally insulating material. Moreover, individual fibers can include an exterior coating such as, without limitation, sizing, to facilitate processing, adhesion of binder, minimize self-adhesion of fiber.

The fibers can have any diameter, which is typically but not necessarily in a range of 1 to 100 microns. The cross-sectional shape of the fiber can be circular, oval, trilobal, polygonal, etc.

Any thermoplastic resin can be used in conjunction with embodiments of the invention. Resins suitable for use in conjunction with embodiments of the invention include any thermoplastic, such as, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), thermoplastic polyurethane (TPU), polyvinyl chloride (PVC). Additionally, thermoset resins can be used in conjunction with the embodiments of the invention. Exemplary thermosets include, without limitation, polyester, thermoset polyurethane, epoxy, polyimides, and vinyl ester.

FIG. 1 depicts the salient elements of system 100 for practicing the methods disclosed herein. In the illustrative embodiment, system 100 includes source 102 of constituent material 104, energy source 106, eyelet 108, and mandrel 110.

In some embodiments, constituent material 104 is a resin-impregnated fiber bundle, such as towpreg, and in some other embodiments, it may be composite tape. In still further embodiments, constituent material 104 includes both a resin-impregnated fiber bundle and composite tape, separately fed to mandrel 110.

FIG. 2 depicts method 200 for the continuous fabrication of preforms/preform charges. Referring now to both FIGS. 1 and 2, constituent material 104 is provided from source 102, which may be a spool, or a process that creates impregnated fiber bundles or tape, such as, without limitation, an in-line filament extruder (for fiber bundles). Regardless of source 102, constituent material 104 must be available on a continuous or semi-continuous basis.

Per operation S201 of method 200, constituent material 104 is heated/reheated by an energy source, such as energy source 106, if the constituent material is below its heat deflection temperature. Constituent material 104 remains above the heat deflection temperature as it is received by mandrel 110. Energy source 106 can be, for example, a source of hot air, infrared emitters, or the like.

In accordance with operation S202, constituent material 104 is wound around a mandrel, such as mandrel 110. The mandrel is rotated about its long axis A-A to collect constituent material 104. The constituent material is maintained under sufficient tension T to ensure that it conforms to the surface profile of mandrel 110. In some embodiments, as a function of the surface profile of mandrel 110, an external applied force, such as may be supplied by a fixture, forces constituent material 104 against mandrel 110.

As mandrel 110 collects constituent material 104, motion 112 of eyelet 108 and/or motion 114 of mandrel 110 in a direction normal to that which the constituent material is being fed results in the formation of coil 116 that extends along the length of mandrel 110. For clarity, coil 116 is shown extending across approximately fifty percent of the length of mandrel 110. It is to be understood that constituent material 104, in its coiled form, can be made to extend any length along mandrel 110, as a function of the amount of relative movement provided between eyelet 108 and mandrel 110.

System 100 has two axes of motion: eyelet (or mandrel) travel per arrows 112, and mandrel rotation about axis A-A. In some variants of system 100, additional axes of motion are provided, such as four axes or six axes, for creating more complex preform charges. In some embodiments, system 100 is computer controlled.

Constituent material 104 is wound around mandrel 110 while the material is above its heat deflection temperature. As necessary, the material is heated to exceed this temperature. This, in conjunction with tension in the constituent material, and, as necessary, an externally applied force (to force the constituent material against a portion of the mandrel), ensures that constituent material conforms to the surface geometry of the mandrel.

In some embodiments, a supplemental heating element (not depicted), re-heats constituent material 104 as it contacts mandrel 110. In some embodiments, this supplemental heating element is disposed within mandrel 110. In some other embodiments, the supplemental heating element is external to mandrel 110, and is, for example, a source of hot air, infrared emitters, or the like. In yet some additional embodiments, mandrel 110 in maintained in a thermally controlled enclosure.

In operation S203, the wound constituent material is allowed to cool below its glass transition temperature, at which time its geometry, as determined by mandrel 110, becomes fixed/set. In some embodiments, mandrel 110 incorporates active cooling, to more rapidly cool the constituent material. This can be accomplished, for example, via fluid channels within mandrel 110 through which cold fluid is passed, via a spray-mist system, or using other methods of heat removal.

Thus, with the geometry fixed as desired via operation of the method, the shape of the preform(s)/preform charge(s) has been realized. The preform(s)/preform charge(s) are then removed from mandrel 110 per operation S204.

The geometry of the mandrel is designed to produce the desired aligned-fiber preforms/preform charges as required for a part that will be fabricated.

FIG. 3A depicts fiber-bundle-based preform 320, wherein a segment of towpreg is bent ninety degrees at a point along its length, resulting in relatively shorter straight portion 322 and relatively longer straight portion 324 separated by 90-degree bend 326.

FIG. 3B depicts a mandrel suitable for forming preform 320 of FIG. 3A. In operation, the mandrel is rotated clockwise, with incoming constituent material 304 (towpreg in this embodiment) in tension on the left. One revolution is capable of creating two "L-shape" preforms: preform 320-1 between locations B-B and C-C, and preform 320-2 between locations D-D and E-E. In some embodiments, the two preforms created per revolution are eventually separated, yielding two preforms identical to preform 320 in FIG. 3A. Alternatively, in the absence of separation, a single rectangular preform results from a single revolution of mandrel 330. If multiple feeds are being simultaneously wound onto mandrel 330 at different (lateral) locations, then more than two preforms are formed per revolution. Note that for clarity, in FIG. 3B and other figures that follow, a gap is depicted between the mandrel and the overlying layer of towpreg. Such a gap is not present; this is strictly for purposes of illustration to distinguish between the surface of the mandrel and the towpreg, or to distinguish overlying layers of constituent material from one another.

Additional revolutions at the same (lateral) position on mandrel 330 creates additional layers of preforms overlying preforms 320-1 and 320-2. In some embodiments, the additional layers would result, after sectioning, in two preform charges, each having multiple layers in the form of preform 320. FIG. 3C depicts preform charge 328, which comprises multiple overlying preforms 320-1. Alternatively, if not sectioned, the additional layers can result in a single rectangular preform charge.

Figure 3D:
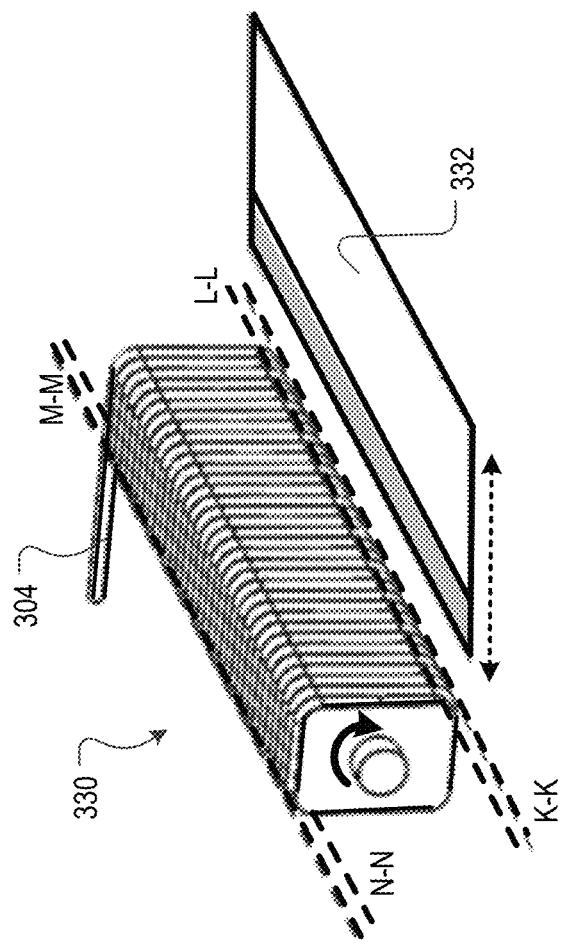
FIG. 3D depicts a method for separating preforms from the mandrel, in accordance with the present teachings.

FIG. 3D depicts a perspective view of mandrel 330, and shows the result of plural revolutions of the mandrel accompanied by relative lateral movement between the mandrel and feed constituent 304 (such as by movement of eyelet 108 and/or the mandrel, see FIG. 1). The result being that feed constituent 304 has wrapped around mandrel 330 along its complete length.

FIG. 3D depicts a method for separating the preforms/preform charges via reciprocating blade 332. A first cut is executed along axis K-K, which is positioned at location D-D (FIG. 3B, extending "into the page"). To effect this cut, blade 332 is advanced towards and penetrates the constituent material wrapping around mandrel 330. The blade is then retracted, with movement occurring along the axis indicated by the arrows.

The mandrel is then rotated slightly clockwise, positioning axis L-L (which is positioned at location C-C, see FIG. 3B) in the cutting plane. Blade 332 is advanced to make the cut, and then retracted. Mandrel 330 is next rotated by about 180 degrees to position axis M-M (aligned with position B-B in FIG. 3B) in the cutting plane, and blade 332 reciprocates to make a third cut. The mandrel is then rotated clockwise a final small amount to bring axis N-N (at position E-E in FIG. 3B) into alignment with blade 332. A fourth and final cut is then made.

In some embodiments, this method will result in a number of preforms (or preform charges if there are multiple revolutions at each lateral winding position along mandrel 330) equal to: 2×the number of mandrel revolutions. This will be the situation when adjacent preforms do not abut one another and there is no secondary means by which the preforms remain linked to one another after cutting.

In some other embodiments, this method results in two preform charges, each of the two preform charges having a length equal to mandrel 330, wherein the preform charge comprises multiple instances of preform 320 positioned side-by-side. In a preform charge, plural preforms are tacked/joined together. This occurs when, for example, adjacent windings of constituent material abut one another, and the temperature thereof at least briefly reaches/surpasses the melt temperature of the polymer resin in the constituent material. This enables adjacent/overlying winds of constituent material to coalesce to a minor degree. Once the temperature of the constituent material falls below the glass transition temperature of the resin, the adjacent preforms are "tacked" in place to one another. Two preform charges can also result if the preforms resulting from each rotation, although not abutting any adjacent preforms, are coupled to one another by a plural separate lengths of feed constituent running along the length of mandrel 330, underlying and/or overlying the wrapped feed constituent.

In an alternative embodiment, separation involves cutting along the axis perpendicular to the mandrel. This creates preform charges each comprising an arbitrary number of "windings" (i.e., preforms), based on where the along the length of the mandrel the cuts are made. And rather than the preform charges having an "L-shape," they have a quadrilateral cross section, mirroring that of the mandrel.

Once separated from one another and the mandrel, the preforms/preform charges can be collected in a receptacle, dropped directly onto a conveyor, deposited directly into a mold, or transported by similar means for further processing.

It is important to note that, regardless of the manner in which the preform charges are formed, they are not fully consolidated; that is, they are not finished parts. A thermoplastic-based preform charge (or preform) must be subjected to significantly more pressure than provided via tension alone to become fully consolidated, at which point any remaining visual indication of the preforms composing the preform charge is lost, and substantially all void space therein is removed. This will occur during the creation of a finished part, such as via compression molding. This is unlike filament winding with thermoplastic resin, wherein compaction rollers are required to provide the pressure required for full consolidation and the creation of a finished article. The pressure provided by the tension on the constituent material that is being wound onto the mandrel is typically at least an order of magnitude less than is provided by the compaction rollers in prior-art filament winding processes using thermoplastic resins. Thus, in accordance with the present teachings, the consolidation pressure experienced by the constituent material, resulting from the applied tension, is insufficient tension to fully consolidate the constituent material, although sufficient for conforming the material to the surface profile of the mandrel. Those skilled in the art can readily determine, such as by simple experimentation, the amount of tension required in the constituent material.

For continuous processing, it is important that tension in the constituent material is maintained when the preforms are separated from the mandrel. This may be achieved, for example, by not cutting the last few wraps of material on the mandrel. When the end of the mandrel is reached during the winding process, the mandrel is translated back to its starting position at a speed and rotation rate that continues to match the tension requirements of material feeding process. As preforms are separated from the mandrel, the section of constituent material that spans the end and beginning of the mandrel (created by the translation of the mandrel back to its starting position) will be separated from the mandrel and scrapped.

To minimize such scrap, in some embodiments, a mandrel shuttling system is used. In such embodiments, as the end of one mandrel is reached during the winding process, a second mandrel will be moved in place to enable the winding process to continue over the second mandrel. Once the preforms are separated from the first mandrel, the first mandrel can be shuttled away and positioned with its beginning adjacent to the end of the second mandrel. Therefore, when the end of the second mandrel is reached, the winding process can continue over the first mandrel.

FIG. 4A depicts another embodiment of a fiber-bundle-based preform. Fiber-bundle-based preform 420 consists of a continuous section of composite towpreg formed into a non-linear 2D path. The path includes three straight segments 422, 426, and 424, and two bends 423 and 425.

FIG. 4B depicts mandrel 430 suitable for forming preform 420 of FIG. 4A. The mandrel has a surface profile that enables the formation of two preforms at a single lateral location along the mandrel. In operation, mandrel 430 is rotated clockwise, with incoming constituent material 404 in tension on the left. First preform 420-1, having the shape of preform 420 of FIG. 4A, is formed between mandrel locations F-F and G-G. Second preform 420-2, having the shape of preform 420 of FIG. 4A, is formed between mandrel locations H-H and J-J.

In order to achieve the concave features 432 at the bended regions, this more complex geometry would require an external force, such as can be provided by a forcing element, non-limiting examples of which are depicted in FIG. 4C and FIG. 4D.

Rotary former 434 is depicted in FIG. 4C. Rotary former 434 rotates into position to press constituent material 403 against surface of mandrel 430 at concave region(s) 432.

FIG. 4D depicts stamper 440. The stamper includes surface 442, which has a complementary shape to surfaces 446 and 448 of mandrel 430. That is, the surfaces "fit" together. Members 444 are coupled to a linear actuator, etc., and are capable of moving stamper 440 towards and away from mandrel 430. As surface 442 of stamper 440 contacts constituent material 404 on surface 446 of the mandrel, it is able to effectively press the constituent material against surface 446 at all locations, and in particular at concave region 432. This causes constituent material 404 to conform to the surface profile of mandrel 430 at all locations on its surface.

The forcing element can have active cooling to cool constituent material 404 below the glass transition temperature of the resin, and provide pressure during cooling to improve consolidation and bonding between any stacked layers or towpreg or tape.

Figure 5:
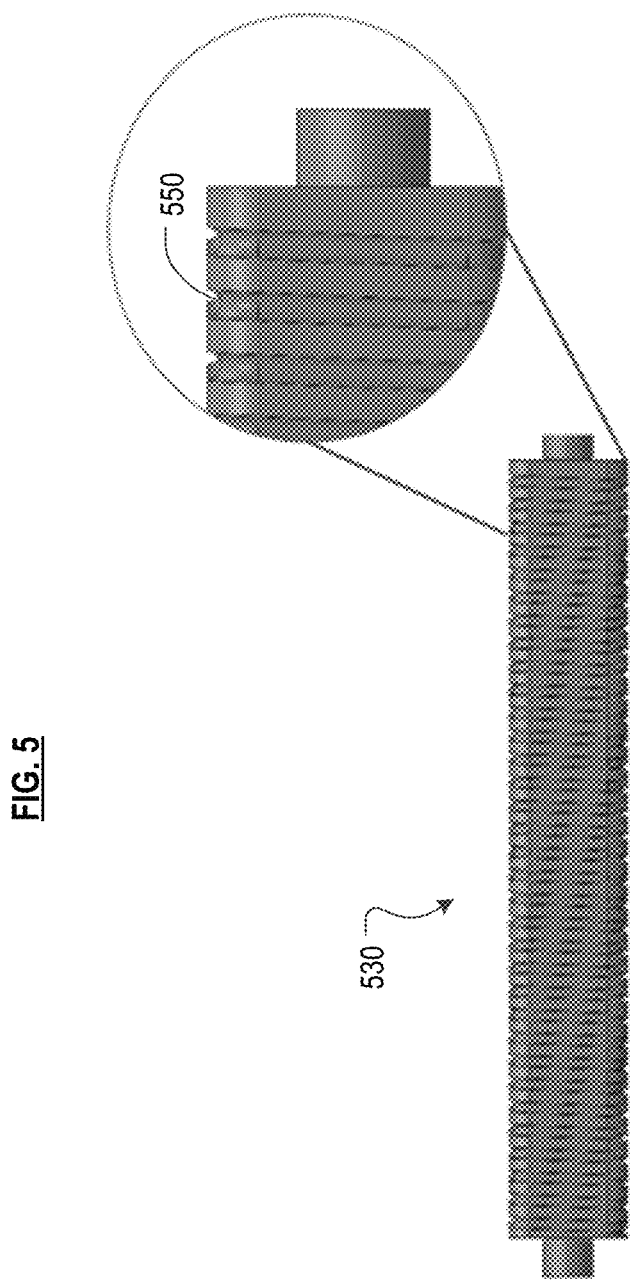
FIG. 5 depicts a mandrel with guide features for guiding constituent material into a desired geometry.

In some further embodiments, features on the surface of a mandrel are used to create relatively more complex geometries. Such features, which may be fixed or actuated, are used to guide the constituent material into a specific location/position, or into a desired planar or non-planar form including angles, curves, straights, and variable cross-sectional shapes. Examples of such features include, without limitation, grooves, pins, hooks, bumps, or overhangs. FIG. 5 depicts mandrel 530, which includes grooves 550 that guide composite material into a desired geometry.

Figure 6:
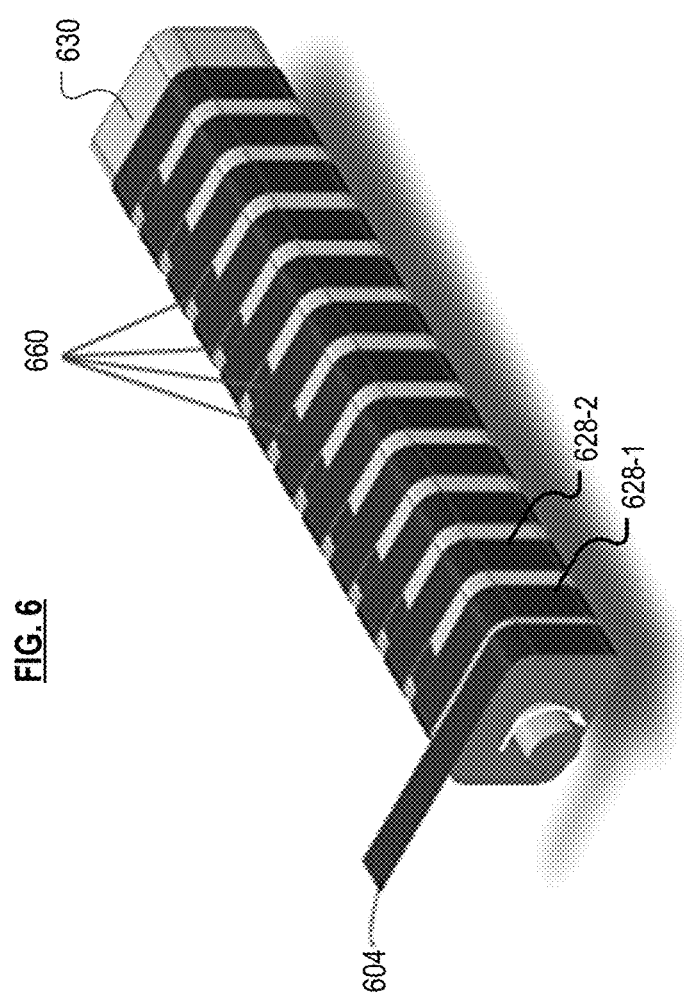
FIG. 6 depicts forming a preform charge via a mandrel, using unidirectional composite tape, in accordance with the present teachings.

FIG. 6 depicts mandrel 630, and plural preform charges 628-$i$, such as 628-1 and 628-2. In this embodiment, constituent material 604 is composite tape, rather than towpreg. The continuously fed constituent material 604 is wound in layers around mandrel 630 to achieve a specific thickness for each composite tape preform charge 628-$i$, before the mandrel is advanced axially to begin winding a subsequent preform charge 628-$i$+1.

The composite-tape preform charges formed on the mandrel may be discretized along the length of the mandrel, using a length 660 of sacrificial constituent material to maintain continuity between preform charges 628-$i$ during the winding process. The preform charges 628-$i$ are then be separated during a removal process, such as discussed below.

Figure 7:
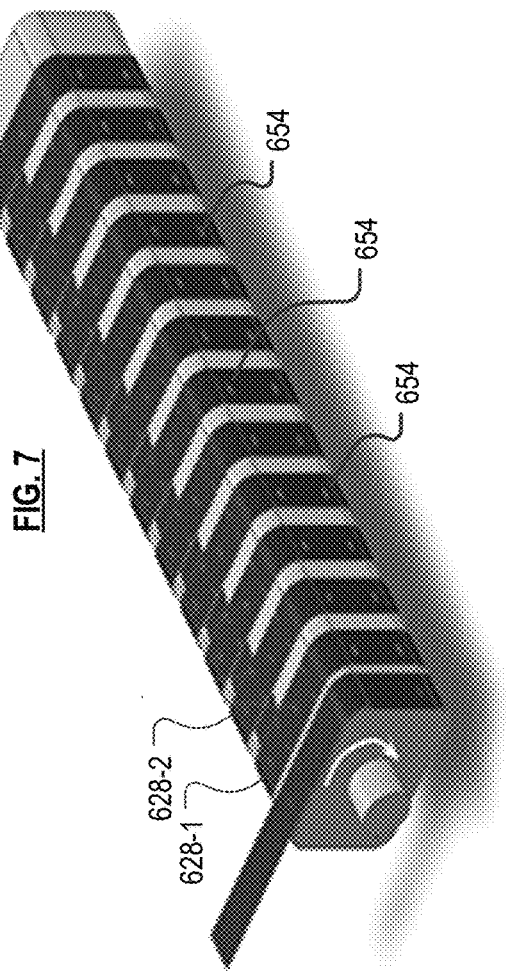
FIG. 7 depicts a further embodiment of a method in accordance with an embodiment of the invention, wherein the preform charge of FIG. 6 is slit.

As depicted in FIG. 7, in some embodiments, preform charges 628-$i$ are "slit," but not completely therethrough, to create small areas of discontinuity 654 with the intention of facilitating fiber and resin flow during a subsequent compression-molding process to form a finished part. This slitting can be performed either before or after constituent material 604 is wound around mandrel 630.

The final operation in the continuous production of preforms or preform charges is to separate the wound material from the mandrel. This can be performed in a variety of ways, including, without limitation, using a reciprocating blade (FIG. 3D), via a collapsing mandrel core, using an ultrasonic cutter, or using a focused heat source (e.g., IR, MR laser, etc.).

Figure 8B:
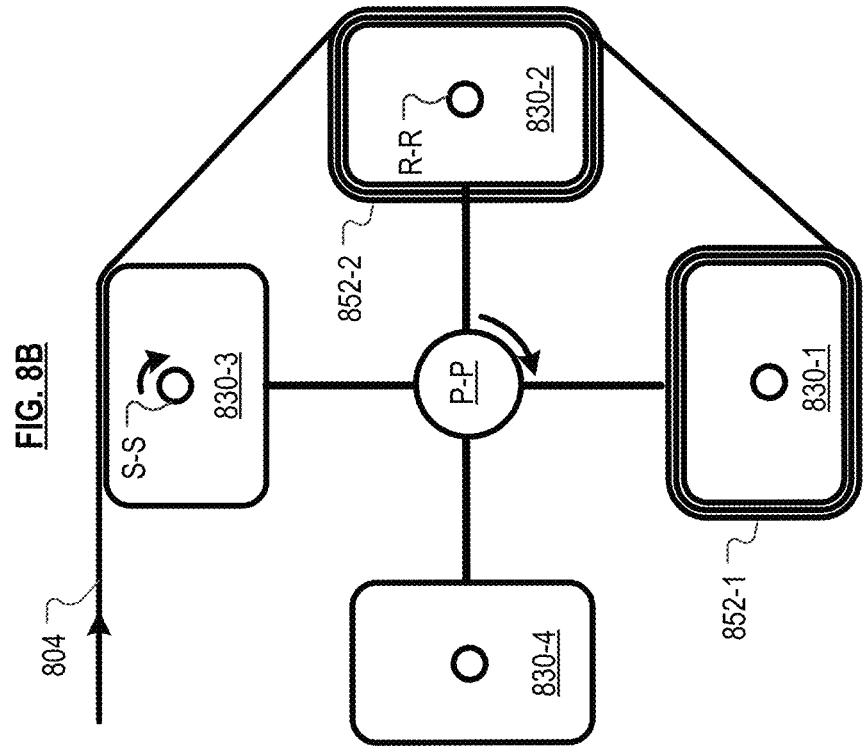
FIGS. 8A and 8B depict an arrangement for continuous winding of mandrels in accordance with an embodiment of the present invention.
Figure 8A:
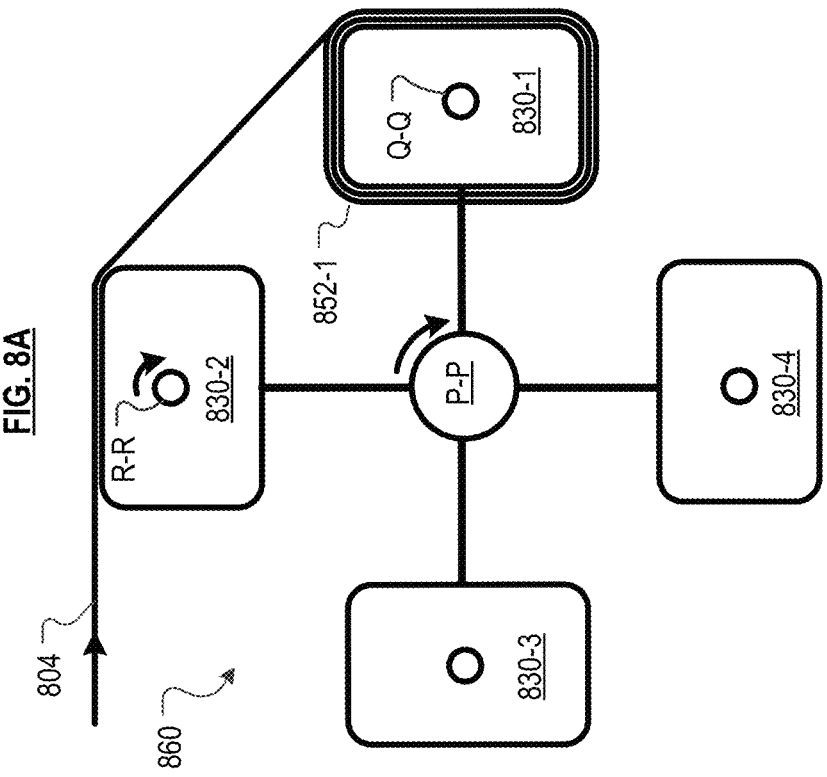

In a further embodiment, tension can be maintained on the constituent material, and scrap minimized, using mandrel pinwheel 860, as depicted in FIGS. 8A and 8B. In this embodiment, constituent material 804 under tension is passed from one mandrel to the next such via rotation of the pinwheel. More particularly, and with reference to FIG. 8A, constituent material 804 under tension is passed from first mandrel 830-1 to second mandrel 830-2 via rotation about primary axis P-P. Meanwhile, secondary rotational axis Q-Q of mandrel 830-1 is locked (to prevent further rotations) and secondary rotational axis R-R of mandrel 830-2 is released to enable the winding process to continue on mandrel 830-2.

Referring now to FIG. 8B, the pinwheel 860 has advanced from its state in FIG. 8A, following the winding of all requisite constituent material 804 onto mandrel 830-2. Thus, the pinwheel rotates clockwise another ninety degrees about primary axis P-P, and constituent material 804 under tension is now passed from second mandrel 830-2 to third mandrel 830-3. Meanwhile, secondary rotational axis R-R of mandrel 830-2 is locked and secondary rotational axis S-S of mandrel 830-3 is released to enable the winding process to continue on mandrel 830-3.

The material between mandrels is removed during the preform/preform charge separation process after all mandrels have been wound.

In some other embodiments (not depicted), tension on constituent material is maintained, and scrap minimized utilizing a reciprocating gripper. When the winding process reaches the end of the mandrel, the reciprocating gripper grabs the constituent material upstream of the mandrel. The constituent material can then be cut downstream of the gripper and the mandrel can be translated back to its starting position. While the gripper grips the constituent material, it is cut, and as the mandrel returns to its starting position, the gripper translates in-line with the material feed rate at a speed that matches the tension required for the upstream process.

Once the mandrel has returned to its starting position, the gripper, while maintaining appropriate tension, attaches the constituent material to the beginning of the mandrel via a fixation device, such cleat or clamp. After such attachment, the gripper releases the constituent material and returns to the position where it will be able to re-grip the constituent material once the end of the mandrel is again reached during the winding process.

In yet some further embodiments, when shuttled mandrels are used, the preforms or preform charges can be left on the mandrel shuttles as they shuttle away from the winding process. In such an embodiment, the shuttles can be used to shuttle the preforms (or preform charges) to the next processing stage (e.g., inspection, molding, etc.). Therefore, once the shuttles reach the next stage, the preforms (or preform charges) can be separated from the mandrel shuttle in an organized fashion that facilitates the next processing stage.

It is to be understood that the disclosure describes a few embodiments and that many variations of the invention can easily be devised by those skilled in the art after reading this disclosure and that the scope of the present invention is to be determined by the following claims.

What is claimed:
1. A method comprising:
 (a) winding a first length of a constituent material around a mandrel, the constituent material consisting essentially of fiber and thermoplastic resin in the form of a fiber bundle or tape, and wherein the constituent material is under a sufficient amount of tension during the winding to conform to a surface profile of the mandrel, but is not subjected to a force sufficient to cause full consolidation of the constituent material;
 (b) removing the constituent material from the mandrel after a temperature of the constituent material falls below a glass-transition temperature of the resin, wherein tension is maintained on a portion of the first length of constituent material, thereby enabling winding a second length of the constituent material around the mandrel, providing for continuous production of wound constituent material; and
 (c) repeating (a) and (b) for the second length of the constituent material.

2. The method of claim 1 comprising heating the first length of constituent material to a temperature that is above a heat-deflection temperature of the resin.

3. The method of claim 1 comprising actively cooling the first length of the wound constituent material.

4. The method of claim 1 wherein removing the constituent material comprises sectioning the wound constituent material into a plurality of preforms or preform charges.

5. The method of claim 4 comprising forming a part by:
 placing at least some of the plurality of preform charges in a mold cavity;
 raising temperature and pressure within the mold cavity, and maintaining raised temperature and pressure for a period of time in accordance with compression molding protocols; and
 ejecting a finished part from the mold cavity.

6. The method of claim 4 comprising placing at least some of the preforms in a preform charge fixture for forming a preform charge.

7. The method of claim 1 wherein the first and second length of constituent material is sourced directly from a fiber impregnation process.

8. The method of claim 1 wherein the mandrel has a polygonal cross section.

9. The method of claim 1 wherein the surface profile of the mandrel comprises a concave feature.

10. The method of claim 9 comprising applying a first force, independent of a force applied by virtue of the tension, to the first length of constituent material proximal to the concave feature, wherein the first force urges the constituent material against the concave feature.

11. The method of claim 1 comprising guiding the first length of constituent material to a specific location or into a specific position via a physical adaptation of the mandrel.

12. The method of claim 1 comprising raising a temperature of the resin to a temperature that is equal to or above a melting point of the resin after the first length of constituent material is wound around the mandrel.

13. A method for forming a partially consolidated, fiber-composite form having a non-linear shape, the method comprising:
 winding a first length of a constituent material around a mandrel, the constituent material consisting essentially of fiber and resin in the form of a fiber bundle or tape, the first length of constituent material maintained under a sufficient amount of tension during the winding to conform to a surface profile of the mandrel, wherein a temperature of the first length of the constituent material is greater than or equal to a heat deflection temperature of the resin;
 removing the constituent material from the mandrel after a temperature of the constituent material falls below a glass-transition temperature of the resin, wherein tension is maintained on a portion of the first length of constituent material; and winding a second length of the constituent material around the mandrel, as enabled by the maintained tension, providing for continuous production of wound constituent material.

14. The method of claim 13 comprising:
 placing at least a first portion of the removed constituent material in a mold cavity; and
 molding a fiber-composite part via compression molding.

15. The method of claim 13 comprising placing at least some of the removed constituent material in a preform-charge fixture and forming a preform charge.

16. The method of claim 15 comprising:
placing the preform charge in a mold cavity; and
molding a fiber-composite part via compression molding.

17. The method of claim 13 wherein the mandrel has a polygonal cross section.

18. The method of claim 13 wherein removing the constituent material comprises cutting the constituent material into preforms or preform charges that have a shape that matches the surface profile of one side of the mandrel.

19. The method of claim 13 wherein removing the constituent material comprises cutting the constituent material into preforms or preform charges that have a shape that is matches the surface profile of two sides of the mandrel.

20. A method comprising:
guiding, via a guide, a first length of a constituent material to a mandrel, wherein the constituent material consists essentially of fiber and thermoplastic resin in the form of a fiber bundle or tape;
winding the constituent material around the mandrel under an amount of tension that is sufficient to conform the constituent material to a surface profile of the mandrel, but insufficient to cause full consolidation of the constituent material;
moving at least one of the guide and the mandrel in a direction normal to a direction in which the constituent material is fed to the mandrel so that the constituent material winds at varying locations along a length of the mandrel;
removing the constituent material from the mandrel after a temperature of the constituent material falls below a glass-transition temperature of the resin, wherein tension is maintained on a portion of the first length of constituent material, thereby enabling winding a second length of the constituent material around the mandrel, providing for continuous production of wound constituent material.

21. The method of claim 20 wherein, during winding of the constituent material, a temperature thereof is above the heat deflection temperature of the thermoplastic resin.

22. The method of claim 20 comprising conforming the constituent material to the surface profile of the mandrel at a location at which the amount of tension in the constituent material is ineffective to do so.

* * * * *